R. H. BOWMAN.
RESILIENT TIRE.
APPLICATION FILED MAR, 21, 1918.
1,392,571.
Patented Oct. 4, 1921.
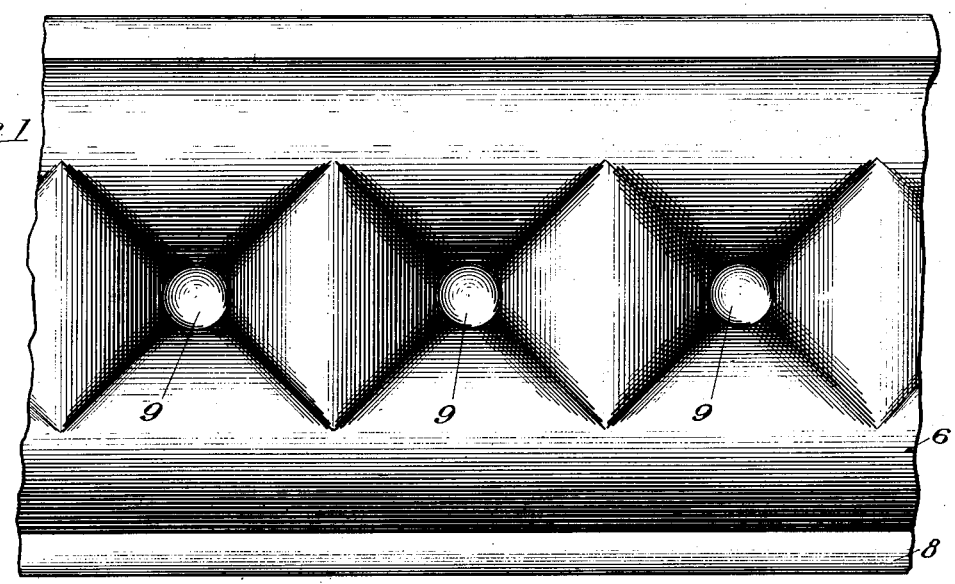
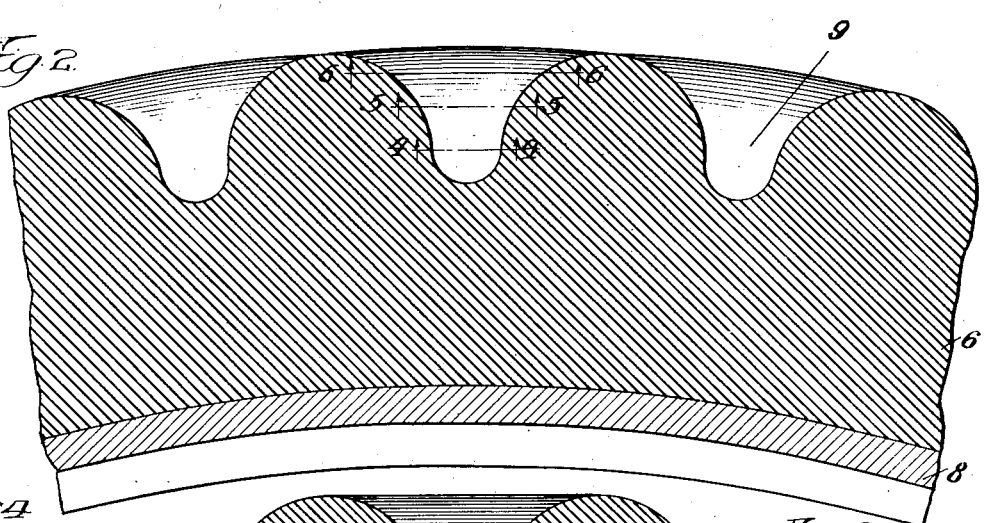
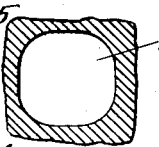
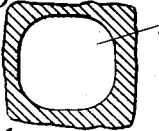
Inventor
Robert H. Bowman

UNITED STATES PATENT OFFICE.

ROBERT H. BOWMAN, OF AKRON, OHIO, ASSIGNOR TO THE FIRESTONE TIRE & RUBBER COMPANY, OF AKRON, OHIO, A CORPORATION OF OHIO.

RESILIENT TIRE.

1,392,571.     Specification of Letters Patent.    Patented Oct. 4, 1921.

Application filed March 21, 1918. Serial No. 223,838.

*To all whom it may concern:*

Be it known that I, ROBERT H. BOWMAN, a citizen of the United States, residing at Akron, in the county of Summit, State of Ohio, have invented certain new and useful Improvements in Resilient Tires, of which the following is a specification.

This invention relates to solid elastic tires adapted for use on trucks or other vehicles, and is intended to provide a construction which will afford the highest degree of resilience and wear.

Solid tires have been designed heretofore with pockets of varying sizes and shapes on the tread but so far as known to me they have all heretofore possessed certain disadvantages due to their faulty construction which it has been the purpose of this invention to overcome. The pockets provided in this tire are large enough so that they will provide adequate suction or vacuum cups and not operate as dirt or mud collectors, and at the same time the tread surface of the tire is smooth and unbroken, so that no jarring is experienced in the operation of the tire.

The invention is illustrated in the accompanying drawings in which—

Figure 1 is a view looking down on the surface of the tire.

Fig. 2 is a longitudinal section through the center thereof.

Fig. 3 is a cross section of the tire through the center of a pocket.

Figs. 4, 5 and 6 are sections on the lines 4—4; 5—5; and 6—6 of Fig. 2.

In the drawings, 6 represents the body of the tire which is secured in any desired manner to a rim 8.

Projecting inwardly from the tread of the tire and extending downwardly into the body of the tire a distance between one-half and one-third of the depth of the tire are a series of pockets 9, which are arranged about the tire in a circumferential row midway between the sides thereof. It will be noted from an inspection of Figs. 4, 5 and 6 that the shape of the pockets is square on the sides with rounded corners converging gradually to a small circle at the bottom of the pocket, the walls bulging outwardly so as to conform more nearly to the distortion of the tires under load. This particular shape allows the rubber constituting the body of the tire to flow under pressure evenly into the cavities and upon release of pressure the cavities expand and free any dirt or mud which may have accumulated therein.

The present tire is a solid ring which has inherent elasticity, and the tread portion is provided with a configuration to give the tread added resiliency, non-skid properties and traction properties by the provision of suction cups defined by the adjacent convex walls of the circumferential tread sections and cross ribs, the convex shape of the walls of the suction cups presenting such a configuration as to facilitate the flow of the tire material under compression and expansion so as to obtain added resiliency in the tread.

The circumferential tread sections 6 are semicircular in cross section, and the transverse ribs are also semicircular in cross section. The transverse ribs connect the circumferential tread sections so as to prevent undue spreading thereof, but the semicircular cross section of the transverse ribs provides a less rigid connection between the circumferential tread sections than would be afforded by cross ribs of full rectangular cross section, because the latter form of ribs would render the circumferential tread sections too rigid, whereas the present configuration of cross ribs provides for satisfactorily tying together the circumferential tread sections while at the same time they do not materially interfere with the desired resiliency of the tread sections. The present form of suction cup, defined by the tread sections 6 and adjacent cross ribs, having its walls convexed longitudinally and merging into the walls of the dished bottom 9 in reflex curves insures the flexibility of the circumferential and transverse tread sections and prevents cracking and splitting of the tire in the bottom of the pockets.

It will be further noted that the entire surface of the tire affords a smooth and continuous bearing surface whereby it rides as smoothly as a plain tread tire, the pockets affording a firm grip, insuring against skidding. By the depressed pockets the anti-skidding feature is obtained without the decrease in efficiency which would result were the pockets raised from the surface of the tire.

It is obvious that changes and modifications may be made in the construction of the tire without departing from the spirit of the invention or sacrificing any of its benefits, and while I have shown only a single row of pockets about the tire it is obvious that it is entirely within the scope of my invention to provide a double row instead of a single row, or to make other changes as may be advisable without departing from the claim.

I claim:

A vehicle tire comprising a solid ring of elastic material having spaced circumferential tread sections of substantially semicircular cross section, and a circumferential series of transverse ribs disposed between the tread sections and extending from top to bottom thereof and integral therewith and of substantially semicircular shape in cross section, the tread sections and ribs defining substantially pyramidal cavities constituting suction cups having their sides convexed longitudinally to permit flow of the tire material under compression and expansion to obtain resiliency and to dislodge accumulations from the side walls of the cups, the bottoms of the cavities being dished and the side walls merging into the bottom walls in reflex curves, the tread faces of the circumferential sections and cross ribs lying in the same circumferential surface of the tire and constituting the tread thereof.

ROBERT H. BOWMAN.